Nov. 22, 1949     R. L. STRATTON     2,488,745
SEQUENTIAL TRIP MECHANISM

Filed March 2, 1944     2 Sheets-Sheet 2

INVENTOR.
ROBERT L. STRATTON
BY
Attorney

Patented Nov. 22, 1949

2,488,745

UNITED STATES PATENT OFFICE 2,488,745

SEQUENTIAL TRIP MECHANISM

Robert L. Stratton, Folcroft, Pa., assignor to I. T. E. Circuit Breaker Company, Philadelphia, Pa., a corporation of Pennsylvania Application March 2, 1944, Serial No. 524,704

10 Claims. (Cl. 200—108)

My invention relates to a novel system of circuit breakers arranged for sequential tripping over the entire protective tripping range of the circuit breakers, including the short circuit current ranges, and more particularly relates to novel circuit breaker apparatus provided with direct acting overload devices which may be adjusted to secure sequential tripping with respect to other breakers in the system.

In radial distribution systems within, for instance, a large industrial plant, the power enters the plant through a main circuit breaker to the main distribution switchboard and is there fed out over a number of feeder circuits each protected by a circuit breaker. These feeders may each go to large loads. Some or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus, in a relatively compact unit, must be operated from a central power source.

In such distribution systems, an overcurrent fault or short circuit condition in one of the feeder circuits, or even in one of the load circuits where the fault current passes through several breakers in series, may result not merely in a tripping of the circuit breaker protecting that particular load, but in a tripping of each of the circuit breakers in series with that particular circuit breaker back to the source, so that one of the main feeder breakers, or even the main breaker itself, may be tripped and thus disconnect the entire distribution system.

Accordingly the primary problem to which this invention is directed is the construction and arrangement of circuit breakers in a distribution system, in such a manner that high speed selective tripping will occur and so that the circuit breaker nearest the fault will be operative to clear an overcurrent fault or short circuit condition, on the particular circuit it is protecting before the overload feature on the circuit breakers between it and the source causes a tripping operation. Also, with this arrangement, each circuit breaker in the system will be protected by the circuit breaker immediately behind it.

More specifically, I have invented a system in which the overload mechanisms of the circuit breakers in the system are so adjusted that the smallest circuit breakers for protecting the individual loads have a higher speed trip characteristic than other breakers in series with them up to their maximum interrupting capacity. At or below maximum interrupting capacity of these load breakers, the adjustment of the overcurrent mechanism of the second largest circuit breaker in series with the load unit breaker becomes quick acting to trip the associated circuit breaker in a very short time, and therefore protects it.

The overcurrent mechanism of the second circuit breaker is in turn adjusted to trip its associated breaker faster than the next larger or third circuit breaker in the series circuit thereby preventing tripping of this next larger circuit breaker at short circuit values up to the maximum interrupting capacity of the second circuit breaker. This last circuit breaker is in turn tripped substantially instantaneously at short circuit currents of values equal to the maximum interrupting capacity of the second circuit breaker.

In sequential tripping systems heretofore employed, the time separation between the various circuit breakers in the system has been effected by the provision of relays which have been set to various time delays and which on operation energize the shunt trip coils. Such systems can only provide sequential operation by timed intervals in the range of seconds since it is necessary in such a system that the relay first be energized sufficiently long to actuate a moving element. When the element has been moved to the energized position, and then only, does it energize the trip coil of the circuit breaker which in turn must operate the trip mechanism.

All of this is a comparatively long time-consuming operation amounting to seconds. Moreover, once the electrically responsive tripping device of a circuit breaker has been energized, it is locked and completes its tripping operation. Therefore to insure sequential tripping, the next larger circuit breaker must have a relay which responds more slowly to a given current than the next smaller circuit breaker relay.

In such systems therefore sequential tripping can, and only has been secured for overcurrent conditions considerably short of short circuit values where the operations must be practically instantaneous in order to protect both circuit breaker and the equipment.

In the Graves Patent 1,924,686 issued August 29, 1933, owned by the same assignee as the present application, there is disclosed a dual overcurrent circuit breaker structure. In this patent there is disclosed an arrangement for providing long time delays in the range from full load to 10 times full load where frequent inrushes of current occur due to motor starting and where it is desirable to hold the breaker in the closed position.

In addition to such time delay these dual overcurrent breakers are equipped with instantaneous trips to secure substantially instantaneous operation on short circuit currents.

Heretofore it has been regarded as impossible to secure selective tripping in this short circuit current range.

I have provided a circuit breaker arrangement employing a dual overcurrent construction, such as shown in this patent, in which I provide a dashpot on what was the instantaneous trip whereby I can effect an inverse time operation of a very short time, securing thereby selective tripping in the short circuit current range.

Accordingly an essential object of my invention is the provision of a circuit breaker tripping device having a long time delay unit attached to the overcurrent device with an additional short time delay unit attached to the fault current response of the dual overcurrent devices.

Figure 1:
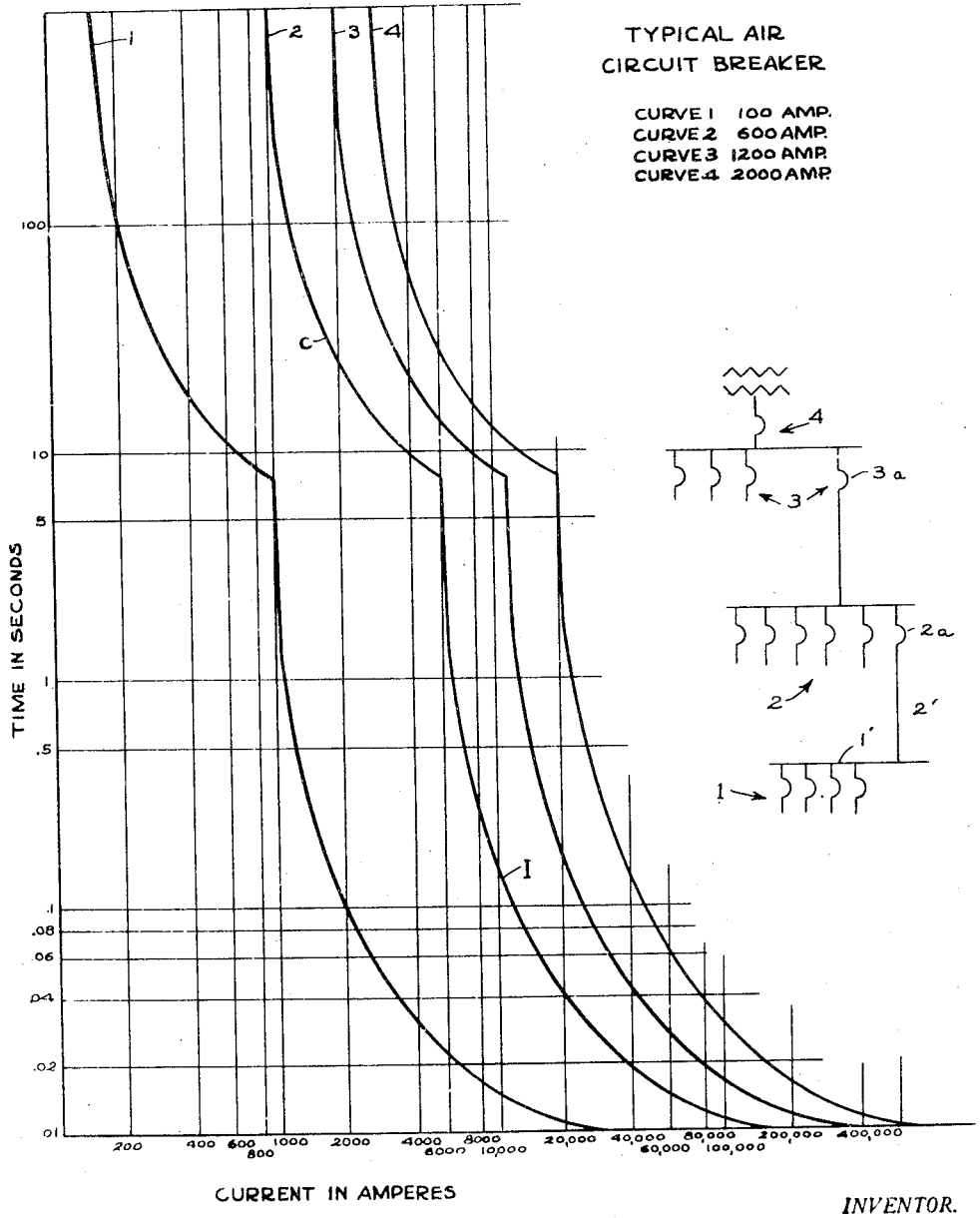
Figure 1 is a diagrammatic illustration of some of the essential principles of my invention.

Referring now to Figure 1, I have here illustrated some of the principles of my method for obtaining appropriate selective tripping of circuit breakers so that only those circuit breakers which are necessary to clear the particular fault open, and so that other breakers, particularly the main and feeder breakers, may remain closed and continue in operation.

The essential principles of selective tripping or appropriate sequential tripping are set forth in the copending application of Herbert C. Graves, Jr. entitled "Sequential tripping of circuit breakers in a system," Serial No. 522,725 filed February 17, 1944 which issued as Patent 2,439,165 on April 6, 1948.

Reference is made to the full explanation contained in the said application of the usefulness and in fact necessity of appropriate sequential operation of circuit breakers in order to obtain selective tripping thereof.

In my present device I contemplate the use of a circuit breaker having dual overcurrent characteristics made possible by the utilization of two armatures operated by a single overcurrent magnet.

In the ordinary dual overcurrent circuit breaker an overcurrent and fault current armature are provided. The overcurrent armature which is intended to trip the circuit breaker on relatively small overcurrent values generally less than 12 times normal breaker rating, is provided with a dashpot time delay device of inverse time characteristics which ensures that false tripping of the circuit breaker on normal current surges of limited duration will not occur by reason of the rise of the armature; that is, assuming that the circuit breaker is a 100 ampere circuit breaker and assuming that a current surge of the order of say 400 amperes may occur for a period of one or two seconds, it is not necessary for the protection of equipment that the circuit breaker open the circuit although if the overcurrent continues at the value of 400 amperes for a period of the order of 20 seconds, the circuit breaker should trip.

The time delay dashpot secured to the overcurrent armature ensures that this operation will occur. The overcurrent armature therefore is one which is so constucted that it may readily be attracted by the overcurrent magnet so that it may be sensitive to relatively low overcurrent values with reliance being placed on the time delay unit to prevent unnecessary tripping of the circuit breaker.

In such circuit breakers, the fault current armature is one which is so arranged that it will come into operation to trip the circuit breaker at a current value which is substantially above the value at which the overcurrent or time-delayed armature will operate, and in the past it has operated instantaneously without any time delay device.

Taking again for example a 100 ampere circuit breaker, it may be desired to prevent an instantaneous trip at any value from 100 amperes to 10 times normal current or 1000 amperes, so that the time delay characteristics of the overcurrent armature time delay device may be made use of to prevent unnecessary tripping.

Also at current values in excess of 10 times normal value, it may be desired to provide for an instantaneous trip which will prevent damage (the system being arranged in this case to permit temporary overcurrents which are 10 times normal to flow without damage to the system).

In the case therefore of a current armature in excess of 10 times normal, the fault current is so arranged that it will be attracted by the magnet to trip the circuit breaker without time delay. Therefore any time delay which is attached solely to the overcurrent or time-delayed armature will have no effect on the fault current armature which in prior circuit breakers have not been time-delayed at all.

The fault current armature may be adjusted in various different ways so that it will not respond until the predetermined excess current or value is reached (10 times normal current in this example).

This adjustment may be made by making the fault current armature of an appropriate weight so that the magnet will be able to attract it only under such excess current conditions or by attaching appropriate springs to the fault current armature which will be effective to prevent its operation at any value below the desired fault current value, or the fault current armature may not only be made of a weight which requires a greater magnetic force in order to attract it but may also be given such a cross-section and shape that a substantial portion of the material thereof does not fall within the most concentrated portion of the magnetic field so that a greater force must be exerted by the magnet to attract it.

Obviously of course, various combinations of the foregoing methods of adjusting the fault current trip so that it will respond only to excess currents of a predetermined value may be used.

In systems such as that shown in the circuit breaker system of Figure 1, where circuit breakers having the dual overcurrent which include a time delayed overcurrent armature and an instantaneous fault current armature, and where no other means are used to control the operation of the fault current armature, it frequently happens that when a short circuit occurs, all the breakers open and all the feeds to all the loads are shut down. This can readily be seen by referring to the circuit breaker of Figure 1 and the values assigned to the various circuit breakers there shown.

Circuit breaker 4 is the main circuit breaker between the source of current and the particular distribution system. Circuit breakers 3 are the main feeder breakers to the load distributing breakers 2. Circuit breakers 2 each control a plurality of load circuit breakers 1. Assuming now that circuit breaker 4 is rated at 2000 amperes, with circuit breakers 3 rated at 1200 amperes, circuit breakers 2 at 600 amperes and circuit breakers 1 at 100 amperes, and assuming further that in each case the fault current trip operates without any time delay at 10 times normal current value, then it will be clear that every fault anywhere in the system greater than 20,000 amperes will trip all the breakers out and shut down all the load fed by the main breaker. The essence of the present invention is the application of selectively variable time delay elements to the fault current trip armature (in addition to the time delay element secured to the overcurrent armature) so that appropriate sequential or selective operation will be obtained.

In the method illustrated in Figure 1, circuit breaker 1 which is rated at 100 amperes ordinarily would become substantially instantaneous at 1000 amperes by reason of the actuation of the fault current armature, as shown in curve 1. However, the addition of a separate time delay element to the fault current armature results in a condition where just above 1000 amperes the circuit breaker will trip within 1 second. At 2000 amperes it will trip in .1 second and at any value above 7000 amperes it will trip within one cycle.

Circuit breaker 2 which is rated at 600 amperes and which would ordinarily become instantaneous at 6000 amperes is provided with a time delay unit on the fault current armature so that at just above 6000 amperes, it will trip in 1 second; at 12,000 amperes it will trip within .1 second; and at about 40,000 amperes it will trip within less than a cycle.

Circuit breaker 3 which is rated at 1200 amperes and which would ordinarily become instantaneous at 12,000 amperes, is also provided with a time delay unit secured to its fault current armature so that at just above 12,000 amperes it will trip in 1 second; at about 25,000 amperes it will trip within .1 second; and at about 80,000 amperes it will trip within one cycle.

Similarly circuit breaker 4 rated at 2000 amperes and which ordinarily would become instantaneous at 20,000 amperes, is provided with a time delay unit attached to the fault current armature so that at just above 20,000 amperes it will trip within 1 second; at 45,000 amperes it will trip within .1 second; and at above 150,000 amperes it will trip within one cycle.

Thus, assuming for instance that a fault condition taking 25,000 amperes occurs in the connector 2' between one of the circuit breakers 2a and the load distribution bus 1', if no time delay were applied to the fault current trip armature of the circuit breakers, then all of the circuit breakers 2, 3 and 4 would be instantaneous at this current value and the whole system would be immobilized.

Applying this assumed fault of 25,000 amperes in the connector 2' to the system where the fault current trip armatures are time delayed in the manner shown in Figure 1, then on such a fault condition circuit breakers 1 which would be by-passed by this fault would not trip at all.

Circuit breaker 2a would trip in about .035 second or in slightly more than two cycles, thus clearing the fault in the connector 2'. The fault current armature of circuit breaker 3a is arranged however so that it would take slightly more than .1 second or more than 6 cycles for this circuit breaker to trip at an overcurrent value of 25,000 amperes. Accordingly circuit breaker 2a will have cleared the fault a substantial length of time before the fault current armature of circuit breaker 3a could move to the tripping position and circuit breaker 3a will thus not be tripped.

Similarly circuit breaker 4 is so arranged that at 25,000 amperes the fault current armature is time delayed for 1 second; therefore the clearing of the fault by circuit breaker 2a in a little over two cycles will prevent the tripping of circuit breaker 4 by its fault current armature.

Accordingly by this means since circuit breaker 4 is prevented from tripping by the sequentially arranged time delay characteristics of the various circuit breakers in the system, all of the circuit breakers 3 including circuit breaker 3a, remain closed and the systems controlled thereby remain in operation.

Similarly since circuit breaker 3a is thus prevented from tripping by the more rapid tripping of circuit break 2a, all of the circuit breakers 2 other than circuit breaker 2a remain closed and the circuits controlled thereby remain in operation. The only portion of the system which is thus shut down is that portion controlled by circuit breaker 2a. Thus, only that portion of the system in which the fault occurs is shut down.

Similar examples may be taken from the curve of Figure 1 with respect to faults of varying intensities in the loads or systems controlled by each of the other circuit breakers.

It will thus be seen that by applying an appropriate relatively short time delay to the fault current tripping armature of a dual overload tripping device of a circuit breaker, appropriate sequential operation of circuit breakers may be obtained so that only those circuit breakers trip which are necessary to clear or isolate the fault and the remainder of the system is not shut down.

The time delay on the fault current armature may also be arranged so that each circuit breaker becomes substantially instantaneous at a value which is necessary to protect the circuit breaker below it. Thus, for instance, assuming that any circuit breaker 1 is in effective to clear a fault at a value above 40,000 amperes and is in fact liable to destruction at such a value, the time delay on the fault current armature of the circuit breaker 2 tripping with circuit breaker 1 is so arranged that at a value of 40,000 amperes or below (depending on the interrupting capacity of the circuit breaker), tripping of the circuit breaker 2 will occur substantially instantaneously, that is, with a time delay of the order of only 1 cycle. This example applies to each of the other successive circuit breakers in turn.

Accordingly not only can the additional time delay of the fault current armature be utilized for the purpose of obtaining appropriate selective and sequential operation as above described, but the time delay of the fault current armature may be so adjusted that the circuit breaker will become fully instantaneous or substantially so at a value which is necessary to protect the circuit breaker next in the system.

As will also appear from the detailed description of the circuit breaker to follow, once a circuit breaker has opened the circuit in response to circuit conditions, the trip operating mechanism of each of the remaining circuit breakers which may have started in operation will return to normal without effecting the tripping mechanism.

Figure 2:
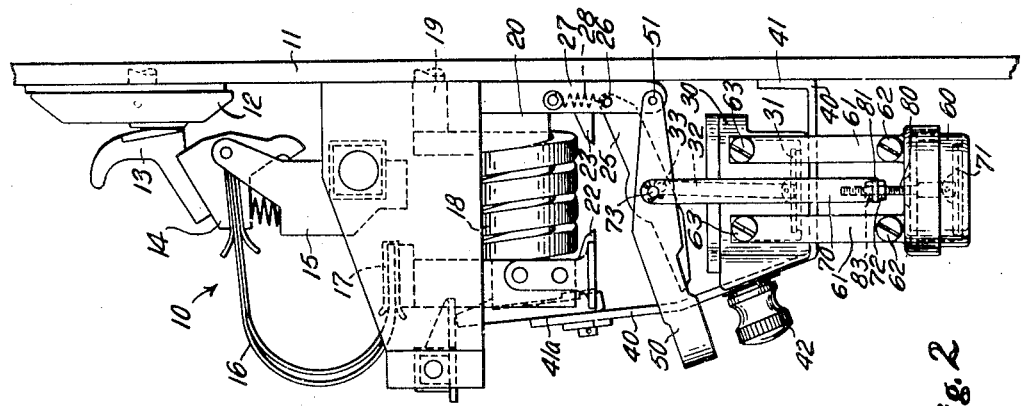
Figure 2 is a side view of a circuit breaker showing especially the tripping device therefor which may be used in connection with the system and method diagrammatically illustrated in Figure 1.
Figure 3:
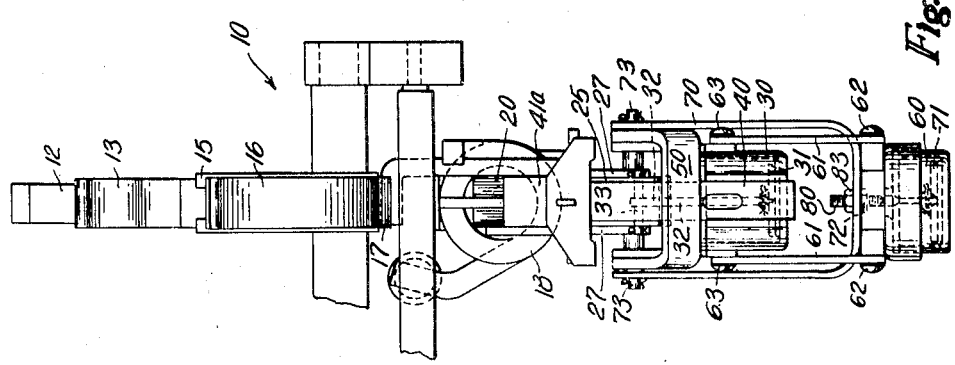
Figure 3 is a front view of the circuit breaker structure of Figure 2.

In Figures 2 and 3 I have shown in simplified form one specific embodiment of a compound time delay (that is, a time delay for the ordinary overcurrent feature and an additional time delay for the fault current device) which may successfully be used in connection with the system and in order to obtain the sequential selective operation described with respect to Figure 1.

Circuit breaker 10 is mounted on panel 11 and is provided with suitable stationary contacts 12 and movable contact 13 supported on plate 14 which is mounted on a movable contact carrying arm 15. Contact 13 may be operated between the closed and open positions in any appropriate manner, as for instance by a mechanism described in Patent No. 1,999,410 issued on April 30, 1935 to H. C. Graves, Jr.

Current from the stationary contacts 12 passes through the movable contact 13, the pigtail 16, to the terminal 17, thence through the series overload coil 18 to the lower back connection stud 19. A magnet 20 (having the pole pieces 22 and 23) is arranged to be energized by the series overcurrent coil 18.

The overcurrent time delayed armature 25 is pivotally mounted by means of the pin 26 in the bracket 27 which is supported from the panel 11. An anti-chatter spring 28 is connected to armature 25 as shown. The overcurrent armature 25 is connected to the time delay dashpot 30, the sucker disk 31 of which is movably connected by means of the link 32 to the pin 33 of armature 25. The dashpot 30 is supported in appropriate position on the bracket 40 which is secured to the panel at 41. The upper end of the supporting member 40 is secured in any appropriate manner to a stationary portion of the circuit breaker at 41a in order to provide a rigid support for the dashpot 30. An adjusting knob 42 is also provided secured in the dashpot 30 through a slot in bracket 41 so that the overcurrent calibration may be varied by raising and lowering the dashpot 30 and the armature 25 to vary the air gap of the overcurrent armature.

Assuming now that the circuit breaker of Figure 2 corresponds to any circuit breaker 2 of Figure 1, and is therefore a circuit breaker having a rated capacity of 600 amperes, then the dashpot 30 is so arranged as to provide the time delay curve C on curve 2 of Figure 1; that is, it provides for a time delay at any overcurrent value up to 6000 amperes. This time delay varies from, say, 100 seconds at 1200 amperes to 4 seconds at 6000 amperes.

At 6000 amperes the fault current armature 50 is attracted by the magnet 20 with sufficient force to lift the armature and attached parts. The armature 50 is pivoted on a pin 51 supported in bracket 27.

A substantial portion of the material thereof lies outside the main portion of the magnetic field of the magnet 20 and the weight is proportioned so as to give the desired characteristics. By this combination of weight and the movement of a substantial portion of the material of the armature to a position where it lies outside of the most concentrated portion of the magnetic field of the magnet, the armature 50 is arranged so that it will not be attracted with sufficient force for motion until the desired excess value of current, corresponding to fault current, is reached (6000 amperes in the example above set forth).

The armature 50 for this purpose is a U-shaped member, the legs of which are supported by the pin 51 on the bracket 27.

In order to obtain the time delay characteristics for the fault current armature shown on portion I curve 2 of Figure 1, the dashpot 60 is connected to this fault current armature 50. Dashpot 60 is stationarily supported with respect to the dashpot 30 by means of the supporting members 61, 61 to which the dashpot 60 is secured by means of the bolts 62, 62 and which supporting members are secured at their upper ends also by means of bolts 63, 63 to the upper dashpot 30. A link 70 is connected at one end to the movable sucker disk 71 of the dashpot 60 and at its upper end is connected to a pin 73 on the fault current armature 50.

By means of the dashpot 60, the fault current armature is given the time delay characteristics shown for instance in section I of curve 2 of Figure 1, the purpose and function of which have been previously described—that is, these additional time delay characteristics of the fault current armature provide for appropriate selective sequential operation of the circuit breakers in the system.

It will now be obvious that should the fault current armature 50 have started to move toward the magnet pole in response to a fault current and some other circuit breaker opens the circuit before the armature engages its associated tripping mechanism, then magnet 20 is promptly de-energized. Since there is substantially no momentum built up in armature 50 due to the delay of action of its dashpot, armature 50 will promptly return to its normal position without effecting its tripping mechanism.

The calibration of the fault current armature so that it will be attracted at different excess fault current settings may be obtained by making the link 70 adjustable in length. That is, the portion 80 of the link 70 which is connected to the movable sucker disk 71 of the dashpot 60 is a threaded member which passes through a flange 81 on the end of the main portion of the link 70; and adjusting nut 72 may then be rotated to vary the length of the threaded section which passes through the flange 81 of the main portion of the link 70 and a lock nut 83 may be provided to maintain this adjustment. Since the dashpot 60 is stationary, the variation obtained by this adjustment in the length of the link 70 results in a raising or lowering of the fault current armature 50 to provide for different excess fault current settings of the fault current armature 50.

The time delay dashpot 60 may also be adjusted in a manner which is now well known, to obtain different time delay characteristics for the fault current armature 50.

Since the dashpot 60 is supported on the dashpot 30, a change in the calibration of the overload armature 25 simultaneously moves the fault current armature 50 and results in a corresponding change in the fault current calibration.

In the foregoing I have described a method for obtaining appropriate sequential selective operation of circuit breakers in a system so that only those circuit breakers which are absolutely necessary to clear the fault may be tripped while the remainder of the system stays in operation.

I have also illustrated one specific physical embodiment of a circuit breaker tripping device which may be used in connection with this method and system in order to obtain the results above set forth.

Many variations and modifications in the system and method as well as in the physical structure necessary or useful in carrying out such a system and method should now be obvious to those skilled in the art. Accordingly I prefer to be bound not by the specific disclosures herein but only by the appended claims.

I claim:

1. In a current breaker, an electromagnet energized by current flowing in the circuit to be protected by said circuit breaker, a first armature responsive solely to the energization of said magnet by overcurrents, a second armature responsive to the energization of said magnet by short circuit currents in said protected circuit for effecting in response to predetermined current values quick tripping of said circuit breaker within the time delay of several cycles, and a time delay mechanism connected to said last mentioned armature for applying an inverse time characteristic to the operation of said last mentioned short circuit armature within the range of several seconds to several cycles depending on the short circuit current value.

2. In a circuit breaker, an electromagnet energized by current flowing in a circuit to be protected by said circuit breaker, an armature controlled by said electromagnet and responsive to the energization of said magnet by overload currents in inverse time relation to the amplitude of said overload current, a short circuit current responsive armature controlled by said electromagnet and operative only in response to short circuit currents in said protected circuit for effecting quick tripping of said circuit breaker within the time delay of several cycles, and a time delay for applying an inverse time characteristic to the operation of said last mentioned armature within the range of said time of several cycles.

3. In a circuit breaker, an electromagnet energized by current flowing in the circuit to be protected by said circuit breaker, an armature controlled by said electromagnet and responsive to the energization of said magnet by overload currents, means for controlling the operation of said armature for operating it in inverse time relation to the amplitude of the overload current energizing said armature, a short circuit current responsive armature controlled by said electromagnet and operative only in response to short circuit currents in said protected circuit for effecting quick tripping of said circuit breaker within the time delay of several cycles, and a time delay for applying an inverse time characteristic to the operation of said last mentioned armature within the range of said time of several cycles.

4. In a circuit breaker, an electromagnet energized by current flowing in the circuit to be protected by said circuit breaker, an armature controlled by said electromagnet and responsive to the energization of said magnet by overload currents, means comprising a dashpot connected to and controlling the operation of said armature for operating it in inverse time relation to the amplitude of the overload current energizing said armature, a short circuit current responsive armature controlled by said electromagnet and operative only in response to short circuit currents in said protected circuit for effecting quick tripping of said circuit breaker within the time delay of several cycles, and a time delay mechanism connected to said last mentioned armature and applying an inverse time characteristic to the operation of said last mentioned armature within the range of said time of several cycles.

5. In a circuit breaker, an electromagnet energized by current flowing in the circuit to be protected by said circuit breaker, an armature responsive to the energization of said magnet by overload currents, means comprising a dashpot connected to said armature for controlling the operation of said armature for operating it in inverse time relation to the amplitude of the overload current energizing said armature, a short circuit current responsive armature operative only in response to short circuit currents in said protected circuit for effecting quick tripping of said circuit breaker within the time delay of several cycles, and a time delay mechanism connected to said last mentioned armature and applying an inverse time characteristic to the operation of said last mentioned armature within the range of said time of several cycles.

6. In a circuit breaker, an electromagnet energized by current flowing in the circuit to be protected by said circuit breaker, an armature responsive to the energization of said magnet by overload currents, means comprising a dashpot connected to said armature for controlling the operation of said armature for operating it in inverse time relation to the amplitude of the overload current energizing said armature, a short circuit current responsive armature operative only in response to short circuit currents in said protected circuit for effecting quick tripping of said circuit breaker within the time delay of several cycles and a time delay dashpot connected to said armature for applying an inverse time characteristic to the operation of said last mentioned armature within the range of said time of several cycles.

7. In a circuit breaker, an electromagnet energized by current flowing in the circuit to be protected by said circuit breaker, an armature responsive to the energization of said magnet by overload currents, means comprising a dashpot connected to said armature and controlling the operation of said armature for operating it in inverse time relation to the amplitude of the overload current energizing said armature, a short circuit current responsive armature operative only in response to short circuit currents in said protected circuit for effecting quick tripping of said circuit breaker within the time delay of several cycles, and a time delay dashpot connected to said last mentioned armature and applying an inverse time characteristic to the operation of said last mentioned armature within the range of said time of several cycles.

8. In a circuit breaker, an electromagnet energized by current flowing in the circuit to be protected by said circuit breaker; a dashpot; an armature connected to said dashpot, said armature being responsive to overload currents for effecting delayed tripping of said circuit breaker, said dashpot delaying the operation of said armature in inverse time delay relation to the amplitude of said current over the range of time of said delayed action; a second dashpot; a second armature connected to said second dashpot and responsive to fault current energization of said electromagnet, said second dashpot effecting an inverse time delay action on said second armature over the range of substantially instantaneous time operation.

9. In a circuit breaker, an electromagnet energized by current flowing in the circuit to be protected by said circuit breaker; a dashpot; an armature connected to said dashpot, said armature being responsive to overload currents for effecting delayed tripping of said circuit breaker, said dashpot delaying the operation of said armature in inverse time relation to the amplitude of said current over the range of time of said delayed action; a second dashpot; a second armature connected to said second dashpot and responsive to fault current energization of said electromagnet, said second dashpot effecting an inverse time delay action on said second armature over the range of quick trip time operation; and individual adjusting means for adjusting the time and current responsive operations of said armatures.

10. In a circuit breaker, an electromagnet energized by current flowing in the circuit to be protected by said circuit breaker; a dashpot; an armature connected to said dashpot, said armature being responsive to overload currents for effecting delayed tripping of said circuit breaker, said dashpot delaying the operation of said armature in inverse time relation to the amplitude of said current over the range of time of said delayed action; a second dashpot; a second armature connected to said second dashpot and responsive to short circuit current energization of said electromagnet, said second dashpot effecting an inverse time delay action on said second armature over the range of quick trip time operation; and individual adjusting means for adjusting the dashpot positions for varying the time and current responsive operations of said armatures.

ROBERT L. STRATTON.

REFERENCES CITED

The following references are of record in the file of this patent:

UNITED STATES PATENTS

| Number | Name | Date |
|---|---|---|
| 663,781 | Parsons | Dec. 11, 1900 |
| 947,981 | Stern | Feb. 1, 1910 |
| 1,288,500 | Burnham | Dec. 24, 1918 |
| 1,289,656 | Cheney | Dec. 31, 1918 |
| 1,329,193 | MacGagan | Jan. 27, 1920 |
| 1,330,094 | Simon | Feb. 10, 1920 |
| 1,893,356 | Blake | Jan. 3, 1933 |
| 2,340,973 | May et al. | Feb. 8, 1944 |
| 2,357,959 | Kouyoumjian | Sept. 12, 1944 |
| 2,439,165 | Graves et al. | Apr. 6, 1948 |